United States Patent
Appella et al.

(10) Patent No.: US 12,551,464 B2
(45) Date of Patent: Feb. 17, 2026

(54) N-(3-AMINO-3-OXOPROPYL)-2-[(1-METHYL-4-NITRO-1H-IMIDAZOL-5-YL)THIO]BENZAMIDE AND ITS USE FOR TREATING HIV INFECTION

(71) Applicant: The United States of America, as represented by the Secretary, Department of Health and Human Services, Bethesda, MD (US)

(72) Inventors: Daniel H. Appella, Rockville, MD (US); Herman Nikolayevskiy, Sausalito, CA (US); Marco Robello, Washington, DC (US); Michael T. Scerba, Baltimore, MD (US)

(73) Assignee: The United States of America, as represented by the Secretary, Department of Health and Human Services, Bethesda, MD (US)

( * ) Notice: Subject to any disclaimer, the term of this patent is extended or adjusted under 35 U.S.C. 154(b) by 861 days.

(21) Appl. No.: 17/785,155

(22) PCT Filed: Dec. 17, 2020

(86) PCT No.: PCT/US2020/065537
§ 371 (c)(1),
(2) Date: Jun. 14, 2022

(87) PCT Pub. No.: WO2021/127133
PCT Pub. Date: Jun. 24, 2021

(65) Prior Publication Data
US 2023/0069100 A1     Mar. 2, 2023

Related U.S. Application Data

(60) Provisional application No. 62/948,939, filed on Dec. 17, 2019.

(51) Int. Cl.
| | | |
|---|---|---|
| *A61K 31/4164* | (2006.01) |
| *A61K 31/427* | (2006.01) |
| *A61K 31/47* | (2006.01) |
| *A61K 31/513* | (2006.01) |
| *A61K 31/52* | (2006.01) |
| *A61K 31/5365* | (2006.01) |
| *A61K 31/635* | (2006.01) |
| *A61K 31/675* | (2006.01) |
| *A61K 39/21* | (2006.01) |
| *A61K 45/06* | (2006.01) |
| *A61P 31/18* | (2006.01) |
| *C07D 233/92* | (2006.01) |

(52) U.S. Cl.
CPC ........ *A61K 31/4164* (2013.01); *A61K 31/427* (2013.01); *A61K 31/47* (2013.01); *A61K 31/513* (2013.01); *A61K 31/52* (2013.01); *A61K 31/5365* (2013.01); *A61K 31/635* (2013.01); *A61K 31/675* (2013.01); *A61K 39/21* (2013.01); *A61K 45/06* (2013.01); *A61P 31/18* (2018.01); *C07D 233/92* (2013.01)

(58) Field of Classification Search
CPC .. A61K 31/4164; A61K 31/427; A61K 31/47; A61K 31/513; A61K 31/52; A61K 31/5365; A61K 31/635; A61K 31/675; A61K 39/21; A61K 45/06; A61K 31/4174; A61P 31/18; C07D 233/92
See application file for complete search history.

(56) References Cited

U.S. PATENT DOCUMENTS

2013/0096092 A1\*   4/2013   Appella ............... C07D 307/72
                                                                    514/471

FOREIGN PATENT DOCUMENTS

| WO | WO 03/014062 A1 | 2/2003 |
| WO | WO 2011/156674 A2 | 12/2011 |

(Continued)

OTHER PUBLICATIONS

Crawford, Duncan J. K., et al. "Rational Design of Novel Immunosuppressive Drugs: Analogues of Azathioprine Lacking the 6-Mercaptopurine Substituent Retain or Have Enhanced Immunosuppressive Effects." Journal of Medicinal Chemistry, vol. 39, No. 14, Jan. 1996, pp. 2690-2695. (Year: 1996).\*

(Continued)

*Primary Examiner* — Clinton A Brooks
*Assistant Examiner* — Kyle Nottingham
(74) *Attorney, Agent, or Firm* — Leydig, Voit & Mayer, Ltd.

(57) ABSTRACT

Disclosed is a compound of formula (I): for treating or preventing a human immunodeficiency virus (HIV) infection in a mammal, for inhibiting or preventing maturation of an immature human immunodeficiency virus (HIV) to a mature HIV, and for preventing or inhibiting a human immunodeficiency virus (HIV) infection in a mammal having at least one HIV viral particle on a surface thereof.

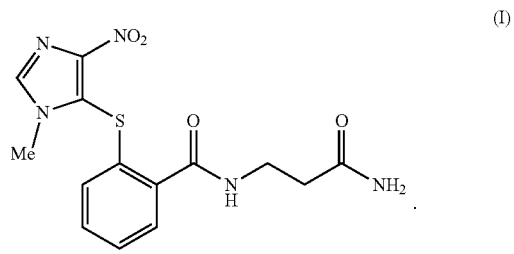

(I)

20 Claims, No Drawings

(56) References Cited

FOREIGN PATENT DOCUMENTS

| WO | WO 2015/035003 A1 | 3/2015 |
|---|---|---|
| WO | WO 2021/127133 A1 | 6/2021 |

OTHER PUBLICATIONS

Nikolayevskiy, Herman, et al. "The Structure-Activity Profile of Mercaptobenzamides' Anti-HIV Activity Suggests That Thermodynamics of Metabolism Is More Important than Binding Affinity to the Target." European Journal of Medicinal Chemistry, vol. 178, Sep. 2019, pp. 818-837. (Year: 2019).*

Elion, Gertrude B., "The Purine Path to Chemotherapy", *Science*, vol. 244: pp. 41-47 (1989).

European Patent Office, Communication pursuant to Article 94(3) EPC issued in European Patent Application No. 20842420.0 (Jun. 29, 2023).

Ahn et al., "Small-Molecule Positive Allosteric modulators of the $\beta_2$-Adrenoceptor Isolated from DNA-Encoded Libraries", *Molecular Pharmacology*, vol. 94: pp. 850-861 (May 8, 2018).

Deluca et al., "Parenteral Drug-Delivery Systems", *Pharmaceutics and Pharmacy Practice*, pp. 238-278 (1982).

Deshmukh et al., "Targeting a Dark Excited State of HIV-1 Nucleocapsid by Antiretroviral Thioesters Revealed by NMR Spectroscopy", *Angewandte Chemie International Edition*, vol. 57(10): pp. 1-10 (Mar. 1, 2018).

Elion, Gertrude B., "The Purine Path to Chemotherapy", *Bioscience Reports*, vol. 9(5): pp. 509-529 (1989).

Hartman et al., "Preclinical evaluation of a mercaptobenzamide and its prodrug for NCp7-targeted inhibition of human immunodeficiency virus", *Antiviral Research*, vol. 134: pp. 216-225 (Aug. 26, 2016).

Miller-Jenkins et al., "Inhibition of HIV Maturation via Selective Unfolding and Cross-Linking of Gag Polyprotein by a Mercaptobenzamide Acetylator", *Journal of the American Chemical Society*, vol. 141: pp. 8327-8338 (May 1, 2019).

Miller-Jenkins et al., "Small molecule inactivation of HIV-1 NCp7 by repetitive intracellular acyl transfer", *National Chemical Biology*, vol. 6(12): pp. 1-6 (2010).

Miller-Jenkins et al., "Specificity of Acyl Transfer from 2-Mercaptobenzamide Thioesters to the HIV-1 Nucleocapsid Protein", *Journal of the American Chemical Society*, vol. 129(36): pp. 11067-11078 (Aug. 18, 2007).

Nikolayevskiy et al., "Reaction Kinetics Direct a Rational Synthesis of an HIV-1 Inactivator of Nucleocapsid Protein 7 and Provide Mechanistic Insight into Cellular Metabolism and Antiviral Activity", *Chemistry A European Journal*, vol. 24(38): pp. 9485-9489 (May 25, 2018).

Saha et al., "Probing Mercaptobenzamides as HIV Inactivators via Nucleocapsid Protein 7", *ChemMedChem*, vol. 12(10): pp. 714-721 (May 22, 2017).

Spira et al., "Impact of clade diversity on HIV-1 virulence, antiretroviral drug sensitivity and drug resistance", *Journal of Antimicrobial Chemotherapy*, vol. 51: pp. 229-240 (Jan. 14, 2003).

Trissel, Lawrence A., "Intravenous Infusion Solutions", *ASHP Handbook on Injectable Drugs Fourth Edition*, pp. 622-646 (1986).

The International Bureau of WIPO, Third Party Observation issued in International Application No. PCT/US2020/065537 (Apr. 25, 2022).

The International Bureau of WIPO, International Preliminary Report on Patentability issued in International Application No. PCT/US2020/065537 (May 17, 2022).

European Patent Office, International Search Report issued in International Application No. PCT/US2020/065537 (Mar. 26, 2021).

European Patent Office, Written Opinion issued in International Application No. PCT/US2020/065537 (Mar. 26, 2021).

* cited by examiner

N-(3-AMINO-3-OXOPROPYL)-2-[(1-METHYL-4-NITRO-1H-IMIDAZOL-5-YL)THIO]BENZAMIDE AND ITS USE FOR TREATING HIV INFECTION

CROSS-REFERENCE TO RELATED APPLICATIONS

This patent application is the U.S. national phase of International Application No. PCT/US2020/065537, filed on Dec. 17, 2020, which claims the benefit of U.S. Provisional Patent Application No. 62/948,939, filed Dec. 17, 2019, the disclosures of which are incorporated herein by reference in their entireties for all purposes.

BACKGROUND OF THE INVENTION

HIV-1 (human immunodeficiency virus-1) infection remains a major medical problem, with approximately 1.8 million people worldwide that were newly infected with HIV-1 in 2017. HIV-1 is a lentivirus which can lead to acquired immunodeficiency syndrome (AIDS). AIDS in humans results in a gradual and persistent decline and failure of the immune system, resulting in heightened risk of life-threatening infection and cancers.

Currently available drugs for the treatment of HIV infection include a wide variety of agents, with the most common agents including those classified as entry inhibitors, reverse transcriptase inhibitors, integrase inhibitors, and protease inhibitors. Each of these classes of antiviral agents target different pathways of the HIV-1 replication cycle. Typically, combinations of two or more agents selected from different classes of these antiviral agents are administered to patients clinically.

A key step in the induction of HIV-1 infection is the maturation of HIV-1 from an immature stage to a mature stage. Agents that selectively target the maturation phase of the infection cycle are rare. A key step in HIV-1 maturation requires the dimerization of Gag-pol, which appears to be a necessary step prior to activation of protease from Gag-pol. Protease inhibitors inhibit protease after activation. Blocking dimerization of Gag-pol would prevent activation of protease and thus the HIV-1 virus would remain blocked in an immature state. However, there are few, if any, antiviral agents that block maturation of immature HIV-1 virus.

Thus, there remains in the art an unmet need for novel agents for the treatment of HIV-1 infection.

BRIEF SUMMARY OF THE INVENTION

The invention provides a compound of formula (I):

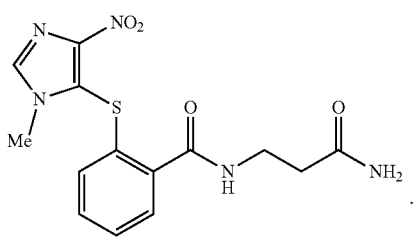

(I)

The invention also provides a method for treating or preventing a human immunodeficiency virus (HIV) infection in a mammal in need thereof, comprising administering to the mammal an effective amount of a compound of formula (I):

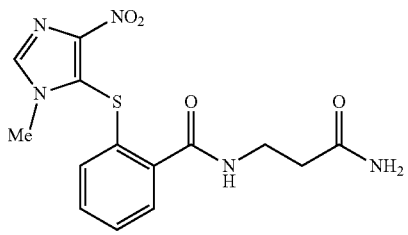

(I)

The invention further provides a method of inhibiting or preventing maturation of an immature human immunodeficiency virus (HIV) to a mature HIV, comprising exposing the immature HIV to an effective amount of a compound of formula (I):

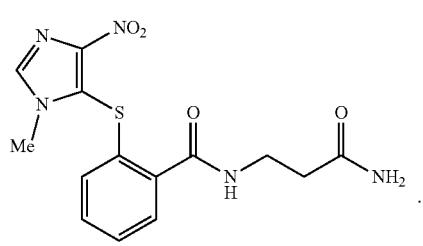

(I)

The invention additionally provides a method of preventing or inhibiting a human immunodeficiency virus (HIV) infection in a mammal in need thereof, wherein the mammal has at least one HIV viral particle on a surface thereof, comprising topically administering to the surface of the mammal an effective amount of a compound of formula (I):

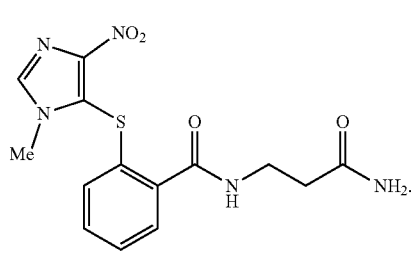

(I)

DETAILED DESCRIPTION OF THE INVENTION

In an embodiment, the invention provides a compound of formula (I):

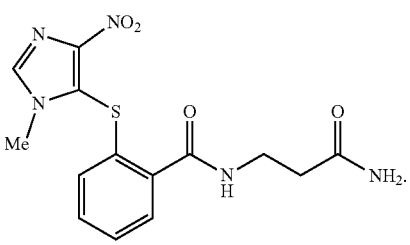

(I)

It is understood that the above compound may form solvates, or exist in a substantially uncomplexed form, such as the anhydrous form. As used herein, the term "solvate" refers to a molecular complex wherein the solvent molecule, such as the crystallizing solvent, is incorporated into the crystal lattice. When the solvent incorporated in the solvate is water, the molecular complex is called a hydrate. Pharmaceutically acceptable solvates include hydrates, alcoholates such as methanolates and ethanolates, acetonitrilates and the like. These compounds can also exist in polymorphic forms.

In another embodiment, the invention provides a method for treating or preventing a human immunodeficiency virus (HIV) infection in a mammal in need thereof, comprising administering to the mammal an effective amount of a compound of formula (I):

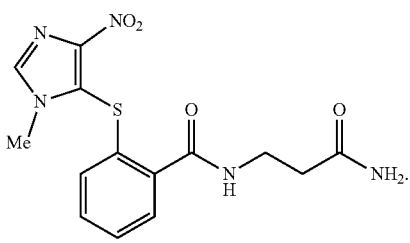

(I)

In certain embodiments, the compound of formula (I) is administered to the subject in combination with a therapeutically effective amount of one or more (e.g., one, two, three, or four; or one or two; or one to three; or one to four) additional therapeutic agents. In certain embodiments, the subject is at risk of contracting the HIV virus, such as a subject who has one or more risk factors known to be associated with contracting the HIV virus. In certain embodiments, the subject may have not previously received antiviral treatment. In certain embodiments, the subject may have previously received antiviral treatment. In certain embodiments, the subject may have previously received antiviral treatment and developed resistance to the previously received antiviral treatment.

In these embodiments, the HIV (e.g., HIV-1) can be a virus selected from the group consisting of HIV Clade A, HIV Clade B, HIV Clade C, HIV Clade D, HIV Clade E, HIV Clade F, HIV Clade G, and HIV Clade O.

In certain embodiments, the compound of formula (I) is administered to the subject in combination with a therapeutically effective amount of one or more (e.g., one, two, three, or four; or one or two; or one to three; or one to four) additional therapeutic agents selected from the group consisting of combination drugs for HIV, other drugs for treating HIV, HIV protease inhibitors, HIV non-nucleoside or non-nucleotide inhibitors of reverse transcriptase, HIV nucleoside or nucleotide inhibitors of reverse transcriptase, HIV integrase inhibitors, HIV non-catalytic site (or allosteric) integrase inhibitors, HIV entry inhibitors, HIV maturation inhibitors, latency reversing agents, compounds that target the HIV capsid, immune-based therapies, phosphatidylinositol 3-kinase (PI3K) inhibitors, HIV antibodies, bispecific antibodies and "antibody-like" therapeutic proteins, HIV p17 matrix protein inhibitors, IL-13 antagonists, peptidyl-prolyl cis-trans isomerase A modulators, protein disulfide isomerase inhibitors, complement C5a receptor antagonists, DNA methyltransferase inhibitor, HIV vif gene modulators, Vif dimerization antagonists, HIV-1 viral infectivity factor inhibitors, TAT protein inhibitors, HIV-1 Nef modulators, Hck tyrosine kinase modulators, mixed lineage kinase-3 (MLK-3) inhibitors, HIV-1 splicing inhibitors, Rev protein inhibitors, integrin antagonists, nucleoprotein inhibitors, splicing factor modulators, COMM domain containing protein 1 modulators, HIV ribonuclease H inhibitors, retrocyclin modulators, CDK-9 inhibitors, dendritic ICAM-3 grabbing nonintegrin 1 inhibitors, HIV GAG protein inhibitors, HIV POL protein inhibitors, Complement Factor H modulators, ubiquitin ligase inhibitors, deoxycytidine kinase inhibitors, cyclin dependent kinase inhibitors, proprotein convertase PC9 stimulators, ATP dependent RNA helicase DDX3X inhibitors, reverse transcriptase priming complex inhibitors, G6PD and NADH-oxidase inhibitors, pharmacokinetic enhancers, HIV gene therapy, HIV gene editing, and HIV vaccines, and any combination thereof.

In certain embodiments, the one or more (e.g., one, two, three, or four; or one or two; or one to three; or one to four) additional therapeutic agents are selected from the group consisting of entry inhibitors, HIV non-nucleoside reverse transcriptase inhibitors, HIV non-nucleotide reverse transcriptase inhibitors, HIV nucleoside reverse transcriptase inhibitors, HIV nucleotide reverse transcriptase inhibitors, integrase inhibitors, protease inhibitors, gp41 inhibitors, CXCR4 inhibitors, gp120 inhibitors, CCR5 inhibitors, capsid polymerization inhibitors, and pharmacokinetic enhancers, and any combination thereof. In certain embodiments, the one or more additional therapeutic agents do not include a pharmacokinetic enhancer.

In certain embodiments, the compound of the invention can be administered in combination with highly active antiretroviral therapy (HAART). As used herein, HAART refers to the use of multiple drugs that act on different viral targets (i.e., different pathways within the viral replication cycle).

In certain embodiments, the additional therapeutics agents comprise a combination of antiretroviral agents selected from the group consisting of: tenofovir, emtricitabine, and raltegravir; tenofovir, emtricitabine, and dolutegravir; abacavir, lamivudine, and dolutegravir; tenofovir, emtricitabine, and elvitegravir; and tenofovir, emtricitabine, ritonavir, and darunavir. The aforesaid combinations are representative of clinically approved examples of HAART.

In another embodiment, the invention provides a method for inhibiting or preventing maturation of an immature human immunodeficiency virus (HIV) to a mature HIV, comprising exposing the immature HIV to an effective amount of a compound of formula (I):

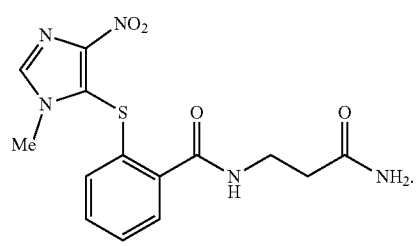

(I)

In certain of these embodiments, the method comprises exposing the immature HIV to an effective amount of a compound of formula (I), to the subject in combination with a therapeutically effective amount of one or more (e.g., one, two, three, or four; or one or two; or one to three; or one to four) additional therapeutic agents. In certain embodiments, the subject is at risk of contracting the HIV virus, such as a subject who has one or more risk factors known to be associated with contracting the HIV virus. In certain embodiments, the subject may have not previously received antiviral treatment. In certain embodiments, the subject may have previously received antiviral treatment. In certain embodiments, the subject may have previously received antiviral treatment and developed resistance to the previously received antiviral treatment.

In these embodiments, the HIV (e.g., HIV-1) can be a virus selected from the group consisting of HIV Clade A, HIV Clade B, HIV Clade C, HIV Clade D, HIV Clade E, HIV Clade F, HIV Clade G, and HIV Clade O.

In certain of these embodiments, the method further comprises administering a therapeutically effective amount of the compound of formula (I) to the subject in combination with a therapeutically effective amount of one or more (e.g., one, two, three, or four; or one or two; or one to three; or one to four) additional therapeutic agents selected from the group consisting of combination drugs for HIV, other drugs for treating HIV, HIV protease inhibitors, HIV non-nucleoside or non-nucleotide inhibitors of reverse transcriptase, HIV nucleoside or nucleotide inhibitors of reverse transcriptase, HIV integrase inhibitors, HIV non-catalytic site (or allosteric) integrase inhibitors, HIV entry inhibitors, HIV maturation inhibitors, latency reversing agents, compounds that target the HIV capsid, immune-based therapies, phosphatidylinositol 3-kinase (PI3K) inhibitors, HIV antibodies, bispecific antibodies and "antibody-like" therapeutic proteins, HIV p17 matrix protein inhibitors, IL-13 antagonists, peptidyl-prolyl cis-trans isomerase A modulators, protein disulfide isomerase inhibitors, complement C5a receptor antagonists, DNA methyltransferase inhibitor, HIV vif gene modulators, Vif dimerization antagonists, HIV-1 viral infectivity factor inhibitors, TAT protein inhibitors, HIV-1 Nef modulators, Hck tyrosine kinase modulators, mixed lineage kinase-3 (MLK-3) inhibitors, HIV-1 splicing inhibitors, Rev protein inhibitors, integrin antagonists, nucleoprotein inhibitors, splicing factor modulators, COMM domain containing protein 1 modulators, HIV ribonuclease H inhibitors, retrocyclin modulators, CDK-9 inhibitors, dendritic ICAM-3 grabbing nonintegrin 1 inhibitors, HIV GAG protein inhibitors, HIV POL protein inhibitors, Complement Factor H modulators, ubiquitin ligase inhibitors, deoxycytidine kinase inhibitors, cyclin dependent kinase inhibitors, proprotein convertase PC9 stimulators, ATP dependent RNA helicase DDX3X inhibitors, reverse transcriptase priming complex inhibitors, G6PD and NADH-oxidase inhibitors, pharmacokinetic enhancers, HIV gene therapy, HIV gene editing, and HIV vaccines, and any combination thereof, is provided.

In certain embodiments, the one or more (e.g., one, two, three, or four; or one or two; or one to three; or one to four) additional therapeutic agents are selected from the group consisting of entry inhibitors, HIV non-nucleoside reverse transcriptase inhibitors, HIV non-nucleotide reverse transcriptase inhibitors, HIV nucleoside reverse transcriptase inhibitors, HIV nucleotide reverse transcriptase inhibitors, integrase inhibitors, protease inhibitors, gp41 inhibitors, CXCR4 inhibitors, gp120 inhibitors, CCR5 inhibitors, capsid polymerization inhibitors, and pharmacokinetic enhancers, and any combination thereof. In certain embodiments, the one or more additional therapeutic agents do not include a pharmacokinetic enhancer.

In certain embodiments, the compound of the invention can be administered in combination with highly active antiretroviral therapy (HAART). As used herein, HAART refers to the use of multiple drugs that act on different viral targets (i.e., different pathways within the viral replication cycle).

In certain embodiments, the additional therapeutic agents comprise a combination of antiretroviral agents selected from the group consisting of: tenofovir, emtricitabine, and raltegravir; tenofovir, emtricitabine, and dolutegravir; abacavir, lamivudine, and dolutegravir; tenofovir, emtricitabine, and elvitegravir; and tenofovir, emtricitabine, ritonavir, and darunavir.

In any of the above embodiments, the human subject can be infected with the immature HIV and thus the immature HIV can be present in a subject (e.g., a human subject). In these embodiments, the exposing of the immature HIV to the compound of formula (I) can be performed by administering the compound of formula (I), or a composition comprising the compound of formula (I) and a pharmaceutically acceptable carrier, to the subject.

In certain embodiments, the invention provides a compound of formula (I):

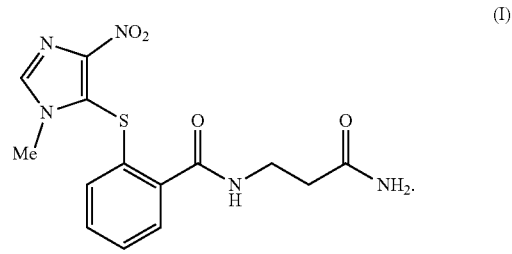 [SMILES: Cn1cnc([N+](=O)[O-])c1Sc1ccccc1C(=O)NCCC(N)=O]

for use in treating or preventing a human immunodeficiency virus (HIV) infection in a mammal in need thereof.

In certain embodiments, the invention provides a compound of formula (I):

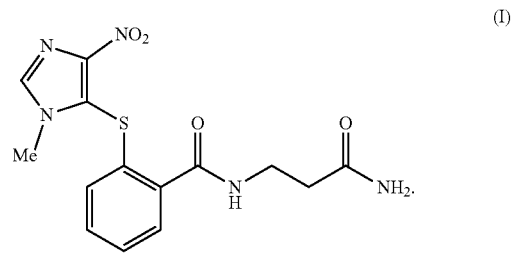 [SMILES: Cn1cnc([N+](=O)[O-])c1Sc1ccccc1C(=O)NCCC(N)=O]

for use in inhibiting or preventing maturation of an immature human immunodeficiency virus (HIV) to a mature HIV.

In certain embodiments, the invention provides a compound of formula (I):

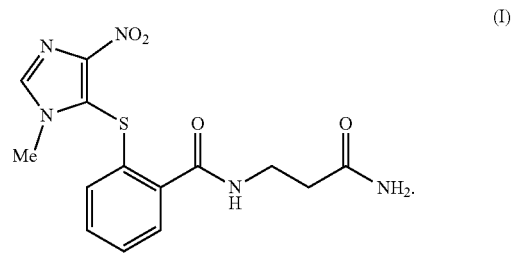 [SMILES: Cn1cnc([N+](=O)[O-])c1Sc1ccccc1C(=O)NCCC(N)=O]

for use in the manufacture of a medicament for treating or preventing a human immunodeficiency virus (HIV) infection in a mammal in need thereof.

In certain embodiments, the invention provides a compound of formula (I):

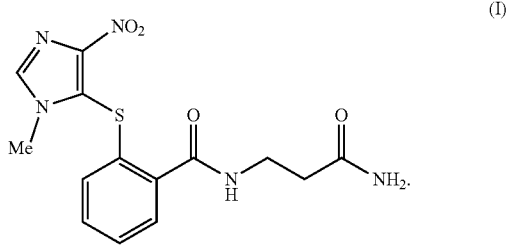 [SMILES: Cn1cnc([N+](=O)[O-])c1Sc1ccccc1C(=O)NCCC(N)=O]

(I)

for use in the manufacture of a medicament inhibiting or preventing maturation of an immature human immunodeficiency virus (HIV) to a mature HIV.

In an embodiment, the invention provides a method of preventing or inhibiting a human immunodeficiency virus (HIV) infection in a mammal in need thereof, wherein the mammal has at least one HIV viral particle on a surface thereof, comprising topically administering to the surface of the mammal an effective amount of a compound of formula (I):

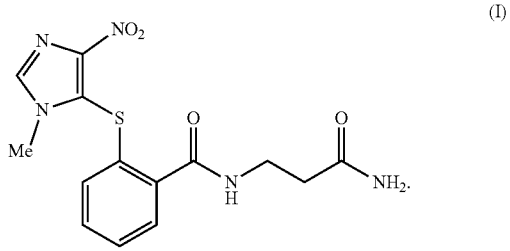 [SMILES: Cn1cnc([N+](=O)[O-])c1Sc1ccccc1C(=O)NCCC(N)=O]

(I)

In these embodiments, the HIV comprises a virus selected from the group consisting of HIV Clade A, HIV Clade B, HIV Clade C, HIV Clade D, HIV Clade E, HIV Clade F, HIV Clade G, and HIV Clade O.

In certain of these embodiments, the compound of formula (I) is administered in the form of a pharmaceutical composition comprising the compound and a pharmaceutically acceptable carrier.

In these embodiments, the surface can be any surface of the subject. For example, the surface can be the (exterior) skin of the subject. The surface can be an interior surface of the subject, for example, the surface of the vagina or other bodily openings (e.g., ear canal, rectum, nasal passages, and the like). In these embodiments, the surface of the subject can be exposed to the immature HIV via interpersonal contact (e.g., via sexual activity), via contact with external surfaces contaminated with samples of infected biological material (e.g., saliva, semen, vaginal secretions, blood, urine, feces, perspiration, pus, wound exudates, mucus, lymph, tears, ear wax, nasal secretions, secretions exuding from diseased or infected skin, and the like).

In certain embodiments, the invention provides a compound of formula (I) for use in preventing or inhibiting a human immunodeficiency virus (HIV) infection in a mammal in need thereof, wherein the mammal has at least one HIV viral particle on a surface thereof.

In certain embodiments, the invention provides a compound of formula (I) for use in the manufacture of a medicament for preventing or inhibiting a human immunodeficiency virus (HIV) infection in a mammal in need thereof, wherein the mammal has at least one HIV viral particle on a surface thereof. In these embodiments, preferably the medicament is adapted for use for topical administration.

In certain embodiments, the compound is administered in the form of a pharmaceutical composition comprising the compound and a pharmaceutically acceptable carrier. Preferably, the pharmaceutical composition is suitable for topical administration, as described herein in connection with the pharmaceutical compositions of the invention.

Formulations and Dosing

The present invention further provides a pharmaceutical composition comprising a compound as described above and a pharmaceutically acceptable carrier. The present invention provides a pharmaceutical composition comprising a pharmaceutically acceptable carrier and an effective amount, e.g., a therapeutically effective amount, including a prophylactically effective amount, of the compound of the present invention.

The pharmaceutically acceptable carrier can be any of those conventionally used and is limited only by chemico-physical considerations, such as solubility and lack of reactivity with the compound, and by the route of administration. It will be appreciated by one of skill in the art that, in addition to the following described pharmaceutical compositions; the compound of the present invention can be formulated as inclusion complexes, such as cyclodextrin inclusion complexes, or liposomes.

The pharmaceutically acceptable carriers described herein, for example, vehicles, adjuvants, excipients, or diluents, are well known to those who are skilled in the art and are readily available to the public. It is preferred that the pharmaceutically acceptable carrier be one which is chemically inert to the active compound and one which has no detrimental side effects or toxicity under the conditions of use.

The choice of carrier will be determined in part by the particular active agent, as well as by the particular method used to administer the composition. Accordingly, there is a wide variety of suitable formulations of the pharmaceutical composition of the present invention. The following formulations for oral, aerosol, parenteral, subcutaneous, intravenous, intraarterial, intramuscular, interperitoneal, intrathecal, rectal, and vaginal administration are merely exemplary and are in no way limiting.

Formulations suitable for oral administration can consist of (a) liquid solutions, such as an effective amount of the compound dissolved in diluents, such as water, saline, or orange juice; (b) capsules, sachets, tablets, lozenges, and troches, each containing a predetermined amount of the active ingredient, as solids or granules; (c) powders; (d) suspensions in an appropriate liquid; and (e) suitable emulsions. Liquid formulations may include diluents, such as water and alcohols, for example, ethanol, benzyl alcohol, and the polyethylene alcohols, either with or without the addition of a pharmaceutically acceptable surfactant, suspending agent, or emulsifying agent. Capsule forms can be of the ordinary hard- or soft-shelled gelatin type containing, for example, surfactants, lubricants, and inert fillers, such as lactose, sucrose, calcium phosphate, and cornstarch. Tablet forms can include one or more of lactose, sucrose, mannitol, corn starch, potato starch, alginic acid, microcrystalline cellulose, acacia, gelatin, guar gum, colloidal silicon dioxide, croscarmellose sodium, talc, magnesium stearate, calcium stearate, zinc stearate, stearic acid, and other excipients, colorants, diluents, buffering agents, disintegrating agents, moistening agents, preservatives, flavoring agents, and pharmacologically compatible carriers. Lozenge forms can comprise the active ingredient in a flavor, usually sucrose and acacia or tragacanth, as well as pastilles comprising the active ingredient in an inert base, such as gelatin and glycerin, or sucrose and acacia, emulsions, gels, and the like containing, in addition to the active ingredient, such carriers as are known in the art.

The compound of the present invention, alone or in combination with other suitable components, can be made into aerosol formulations to be administered via inhalation. These aerosol formulations can be placed into pressurized acceptable propellants, such as dichlorodifluoromethane, propane, nitrogen, and the like. They also may be formulated as pharmaceuticals for non-pressured preparations, such as in a nebulizer or an atomizer.

Formulations suitable for parenteral administration include aqueous and non-aqueous, isotonic sterile injection solutions, which can contain anti-oxidants, buffers, bacteriostats, and solutes that render the formulation isotonic with the blood of the intended recipient, and aqueous and non-aqueous sterile suspensions that can include suspending agents, solubilizers, thickening agents, stabilizers, and preservatives. The compound can be administered in a physiologically acceptable diluent in a pharmaceutical carrier, such as a sterile liquid or mixture of liquids, including water, saline, aqueous dextrose and related sugar solutions, an alcohol, such as ethanol, isopropanol, or hexadecyl alcohol, glycols, such as propylene glycol or polyethylene glycol, glycerol ketals, such as 2,2-dimethyl-1,3-dioxolane-4-methanol, ethers, such as poly(ethyleneglycol) 400, an oil, a fatty acid, a fatty acid ester or glyceride, or an acetylated fatty acid glyceride with or without the addition of a pharmaceutically acceptable surfactant, such as a soap or a detergent, suspending agent, such as pectin, carbomers, methylcellulose, hydroxypropylmethylcellulose, or carboxymethylcellulose, or emulsifying agents and other pharmaceutical adjuvants.

Oils, which can be used in parenteral formulations include petroleum, animal, vegetable, or synthetic oils. Specific examples of oils include peanut, soybean, sesame, cottonseed, corn, olive, petrolatum, and mineral. Suitable fatty acids for use in parenteral formulations include oleic acid, stearic acid, and isostearic acid. Ethyl oleate and isopropyl myristate are examples of suitable fatty acid esters. Suitable soaps for use in parenteral formulations include fatty alkali metal, ammonium, and triethanolamine salts, and suitable detergents include (a) cationic detergents such as, for example, dimethyl dialkyl ammonium halides, and alkyl pyridinium halides, (b) anionic detergents such as, for example, alkyl, aryl, and olefin sulfonates, alkyl, olefin, ether, and monoglyceride sulfates, and sulfosuccinates, (c) nonionic detergents such as, for example, fatty amine oxides, fatty acid alkanolamides, and polyoxyethylene-polypropylene copolymers, (d) amphoteric detergents such as, for example, alkyl-beta-aminopropionates, and 2-alkyl-imidazoline quaternary ammonium salts, and (3) mixtures thereof.

The parenteral formulations will typically contain from about 0.5 to about 25% by weight of the active ingredient in solution. Suitable preservatives and buffers can be used in such formulations. In order to minimize or eliminate irritation at the site of injection, such compositions may contain one or more nonionic surfactants having a hydrophile-lipophile balance (HLB) of from about 12 to about 17. The quantity of surfactant in such formulations ranges from about 5 to about 15% by weight. Suitable surfactants include polyethylene sorbitan fatty acid esters, such as sorbitan monooleate and the high molecular weight adducts of ethylene oxide with a hydrophobic base, formed by the condensation of propylene oxide with propylene glycol. The parenteral formulations can be presented in unit-dose or multi-dose sealed containers, such as ampoules and vials, and can be stored in a freeze-dried (lyophilized) condition requiring only the addition of the sterile liquid carrier, for example, water, for injections, immediately prior to use. Extemporaneous injection solutions and suspensions can be prepared from sterile powders, granules, and tablets of the kind previously described.

The compound of the present invention may be made into injectable formulations. The requirements for effective pharmaceutical carriers for injectable compositions are well known to those of ordinary skill in the art. See *Pharmaceutics and Pharmacy Practice*, J. B. Lippincott Co., Philadelphia, Pa., Banker and Chalmers, eds., pages 238-250 (1982), and *ASHP Handbook on Injectable Drugs*, Toissel, 4th ed., pages 622-630 (1986).

Topical formulations, including those that are useful for transdermal drug release, are well-known to those of skill in the art and are suitable in the context of the invention for application to skin. Topically applied compositions are generally in the form of liquids, creams, pastes, lotions and gels. Topical administration includes application to the skin, mucosal tissue, the oral mucosa, which includes the oral cavity, oral epithelium, palate, gingival, and the nasal mucosa. In some embodiments, the composition contains at least one active component and a suitable vehicle or carrier. It may also contain other components, such as an anti-irritant. The carrier can be a liquid, solid or semi-solid. In embodiments, the composition is an aqueous solution. Alternatively, the composition can be a dispersion, emulsion, gel, lotion or cream vehicle for the various components. In one embodiment, the primary vehicle is water or a biocompatible solvent that is substantially neutral or that has been rendered substantially neutral. The liquid vehicle can include other materials, such as buffers, alcohols, glycerin, and mineral oils with various emulsifiers or dispersing agents as known in the art to obtain the desired pH, consistency and viscosity. It is possible that the compositions can be produced as solids, such as powders or granules. The solids can be applied directly or dissolved in water or a biocompatible solvent prior to use to form a solution that is substantially neutral or that has been rendered substantially neutral and that can then be applied to the target site. In embodiments of the invention, the vehicle for topical application to the skin can include water, buffered solutions, various alcohols, glycols such as glycerin, lipid materials such as fatty acids, mineral oils, phosphoglycerides, collagen, gelatin and silicone based materials.

Additionally, the compound of the present invention may be made into suppositories by mixing with a variety of bases, such as emulsifying bases or water-soluble bases. Formulations suitable for vaginal administration may be presented as pessaries, tampons, creams, gels, pastes, foams, or spray formulas containing, in addition to the active ingredient, such carriers as are known in the art to be appropriate.

The dose administered to a mammal, particularly, a human, in accordance with the present invention should be sufficient to effect the desired response. Such responses include reversal or prevention of the adverse effects of the disease for which treatment is desired or to elicit the desired benefit. One skilled in the art will recognize that dosage will depend upon a variety of factors, including the age, condition, and body weight of the human, as well as the source, particular type of the disease, and extent of the disease in the human. The size of the dose will also be determined by the route, timing and frequency of administration as well as the existence, nature, and extent of any adverse side effects that might accompany the administration of a particular compound and the desired physiological effect. It will be appreciated by one of skill in the art that various conditions or disease states may require prolonged treatment involving multiple administrations.

The compound of formula (I), alone or in combination with one or more additional therapeutic agents, may be administered to a subject in accordance with an effective dosing regimen for a desired period of time or duration, such as at least about one day, at least about one week, at least about one month, at least about 2 months, at least about 3 months, at least about 4 months, at least about 6 months, or at least about 12 months or longer. In one variation, the compound of formula (I) is administered on a daily or intermittent schedule. In one variation, the compound of formula (I) is administered on a monthly schedule. In one variation, the compound is administered every two months. In one variation, the compound of formula (I) is administered every three months. In one variation, the compound of formula (I) is administered every four months. In one variation, the compound of formula (I) is administered every five months. In one variation, the compound of formula (I) is administered every 6 months.

Suitable doses and dosage regimens can be determined by conventional range-finding techniques known to those of ordinary skill in the art. Generally, treatment is initiated with smaller dosages that are less than the optimum dose of the compound. Thereafter, the dosage is increased by small increments until the optimum effect under the circumstances is reached. The present inventive method typically will involve the administration of about 0.1 to about 300 mg of the compound described above per kg body weight of the animal or mammal.

The therapeutically effective amount of the compound administered can vary depending upon the desired effects and the factors noted above. Typically, dosages will be between 0.01 mg/kg and 250 mg/kg of the subject's body weight, and more typically between about 0.05 mg/kg and 100 mg/kg, such as from about 0.2 to about 80 mg/kg, from about 5 to about 40 mg/kg or from about 10 to about 30 mg/kg of the subject's body weight. Thus, unit dosage forms can be formulated based upon the suitable ranges recited above and the subject's body weight. The term "unit dosage form" as used herein refers to a physically discrete unit of therapeutic agent appropriate for the subject to be treated.

Alternatively, dosages are calculated based on body surface area and from about 1 mg/m$^2$ to about 200 mg/m$^2$, such as from about 5 mg/m$^2$ to about 100 mg/m$^2$ will be administered to the subject per day. In particular embodiments, administration of the therapeutically effective amount of the compound involves administering to the subject from about 5 mg/m$^2$ to about 50 mg/m$^2$, such as from about 10 mg/m$^2$ to about 40 mg/m$^2$ per day. It is currently believed that a single dosage of the compound is suitable, however a therapeutically effective dosage can be supplied over an extended period of time or in multiple doses per day. Thus, unit dosage forms also can be calculated using a subject's body surface area based on the suitable ranges recited above and the desired dosing schedule.

In any of the above embodiments, the inventive methods further prevent, inhibit, or delay the development or progression of AIDS in a subject infected with an HIV virus, e.g., an immature HIV virus. As used herein, "delaying" development of a disease or condition means to defer, hinder, slow, retard, stabilize and/or postpone development of the disease or condition. This delay can be of varying lengths of time, depending on the history of the disease and/or subject being treated. As is evident to one skilled in the art, a sufficient or significant delay can, in effect, encompass prevention, in that the subject does not develop the disease or condition. For example, a method that "delays" development of AIDS is a method that reduces the probability of disease development in a given time frame and/or reduces extent of the disease in a given time frame, when compared to not using the method. Such comparisons may be based on clinical studies, using a statistically significant number of subjects. For example, the development of AIDS can be detected using known methods, such as confirming a subject's HIV$^+$ status and assessing the subject's T-cell count or other indication of AIDS development, such as extreme fatigue, weight loss, persistent diarrhea, high fever, swollen lymph nodes in the neck, armpits or groin, or presence of an opportunistic condition that is known to be associated with AIDS (e.g., a condition that is generally not present in subjects with functioning immune systems but does occur in AIDS patients). Development may also refer to disease progression that may be initially undetectable and includes occurrence, recurrence and onset.

Examples of combination drugs include tenofovir, emtricitabine, and raltegravir; tenofovir, emtricitabine, and dolutegravir; abacavir, lamivudine, and dolutegravir; tenofovir, emtricitabine, and elvitegravir; emtricitabine, ritonavir, and darunavirefavirenz, tenofovir disoproxil fumarate (ATRIPLA™), and emtricitabine); rilpivirine, tenofovir disoproxil fumarate, and emtricitabine (COMPLERA™); elvitegravir, cobicistat, tenofovir disoproxil fumarate, and emtricitabine (STRIBILD™); tenofovir disoproxil fumarate and emtricitabine (TRUVADA™); tenofovir alafenamide and emtricitabine (DESCOVY™); tenofovir alafenamide, emtricitabine, and rilpivirine (ODEFSEY™); tenofovir alafenamide (GENVOYA™), zidovudine and lamivudine (COMBIVIR™); abacavir sulfate and lamivudine (EPZICOM™); lopinavir and ritonavir (KALETRA™); dolutegravir, abacavir, and lamivudine (TRIUMEQ™); abacavir sulfate, zidovudine, and lamivudine (TRIZIVIR™); emtricitabine, cobicistat, and elvitegravir; darunavir, tenofovir alafenamide hemifumarate, emtricitabine, and cobicistat; efavirenz, lamivudine, and tenofovir disoproxil fumarate; lamivudine and tenofovir disoproxil fumarate; tenofovir and lamivudine; tenofovir alafenamide and emtricitabine; tenofovir alafenamide hemifumarate and emtricitabine; tenofovir alafenamide hemifumarate, emtricitabine, and rilpivirine; tenofovir alafenamide hemifumarate, emtricitabine, cobicistat, and elvitegravir; atazanavir and cobicistat; atazanavir sulfate and cobicistat; atazanavir sulfate and ritonavir; darunavir and cobicistat; dolutegravir and rilpivirine; dolutegravir and rilpivirine hydrochloride; dolutegravir, abacavir sulfate, and lamivudine; lamivudine, nevirapine, and zidovudine; raltegravir and lamivudine; doravirine, lamivudine, and tenofovir disoproxil fumarate; doravirine, lamivudine, and tenofovir disoproxil; dolutegravir+lamivudine, lamivudine+abacavir+zidovudine, lamivudine+abacavir, lamivudine+tenofovir disoproxil fumarate, lamivudine+zidovudine+nevirapine, lopinavir+ritonavir, lopinavir+ritonavir+abacavir+lamivudine, lopinavir+ritonavir+zidovudine+lamivudine, tenofovir+lamivudine, and tenofovir disoproxil fumarate+emtricitabine+rilpivirine hydrochloride, lopinavir, ritonavir, zidovudine and lamivudine; Vacc-4x and romidepsin; and APH-0812.

Non-limiting examples of other drugs for treating HIV include acemannan, alisporivir, BanLec, deferiprone, Gamimune, metenkefalin, naltrexone, and Prolastin.

Non-limiting examples of HIV protease inhibitors include amprenavir, atazanavir, brecanavir, darunavir, fosamprenavir, fosamprenavir calcium, indinavir, indinavir sulfate, lopinavir, nelfinavir, nelfinavir mesylate, ritonavir, saquinavir, saquinavir mesylate, and tipranavir.

Non-limiting examples of HIV non-nucleoside or non-nucleotide inhibitors of reverse transcriptase include dapivirine, delavirdine, delavirdine mesylate, doravirine, efavirenz, etravirine, lentinan, nevirapine, and rilpivirine.

Non-limiting examples of HIV nucleoside or nucleotide inhibitors of reverse transcriptase include adefovir, adefovir dipivoxil, azvudine, emtricitabine, tenofovir, tenofovir alafenamide, tenofovir alafenamide fumarate, tenofovir alafenamide hemifumarate, tenofovir disoproxil, tenofovir disoproxil fumarate, tenofovir disoproxil hemifumarate, didanosine and ddI, abacavir, abacavir sulfate, alovudine, apricitabine, censavudine, didanosine, elvucitabine, festinavir, fosalvudine tidoxil, dapivirine, doravirine, etravirine, tenofovir disoproxil orotate, fozivudine tidoxil, lamivudine, phosphazid, stavudine, zalcitabine, and zidovudine.

Non-limiting examples of HIV integrase inhibitors include elvitegravir, curcumin, chicoric acid, 3,5-dicaffeoylquinic acid, aurintricarboxylic acid, caffeic acid phenethyl ester, derivatives of caffeic acid phenethyl ester, tyrphostin, quercetin, raltegravir, dolutegravir, bictegravir, cabotegravir, integrase-LEDGF inhibitors, ledgins, and cabotegravir.

Non-limiting examples of HIV non-catalytic site, or allosteric, integrase inhibitors include CX-05045, CX-05168, and CX-14442.

Non-limiting examples of HIV entry (fusion) inhibitors include cenicriviroc, CCR5 inhibitors, gp41 inhibitors, CD4 attachment inhibitors, gp120 inhibitors, and CXCR4 inhibitors.

Non-limiting examples of CCR5 inhibitors include aplaviroc, vicriviroc, maraviroc, cenicriviroc, PRO-140, adaptavir (RAP-101), nifeviroc, and anti-GP120/CD4 or CCR5 bispecific antibodies.

Non-limiting examples of gp41 inhibitors include albuvirtide, enfuvirtide, enfuvirtide biobetter, enfuvirtide biosimilar, HIV-1 fusion inhibitors, and sifuvirtide.

Non-limiting examples of CD4 attachment inhibitors include ibalizumab and CADA analogs.

A non-limiting example of a gp120 inhibitor include fostemsavir tromethamine.

A non-limiting example of a CXCR4 inhibitor includes plerixafor.

Non-limiting examples of HIV maturation inhibitors include BMS-955176 and GSK-2838232.

Non-limiting examples of latency reversing agents include histone deacetylase (HDAC) inhibitors, proteasome inhibitors (e.g., velcade), protein kinase C (PKC) activators, BET-bromodomain 4 (BRD4) inhibitors, ionomycin, PMA, SAHA, IL-15, JQT, disulfram, amphotericin B, and ubiquitin inhibitors such as largazole analogs.

Non-limiting examples of HDAC inhibitors include romidepsin, vorinostat, and panobinostat.

Non-limiting examples of PKC activators include indolactam, prostratin, ingenol B, and DAG-lactones.

Non-limiting examples of capsid inhibitors include capsid polymerization inhibitors or capsid disrupting compounds, HIV nucleocapsid p7 (NCp7) inhibitors such as azodicarbonamide and HIV p24 capsid protein inhibitors.

Non-limiting examples of immune-based therapies include toll-like receptors (TLR) modulators such as tlr1, tlr2, tlr3, tlr4, tlr5, tlr6, tlr7, tlr8, tlr9, tlr10, tlr11, tlr12, and tlr13; programmed cell death protein 1 (Pd-1) modulators; programmed death-ligand 1 (Pd-L1) modulators; IL-15 agonists; interleukin-7; plaquenil (hydroxychloroquine); proleukin; interferon alfa; interferon α-2b; interferon α-n3; pegylated interferon α; interferon γ; hydroxyurea; mycophenolate mofetil ribavirin; rintatolimod, polyethyleneimine; gepon; rintatolimod; IL-12; WF-10; VGV-1; MOR-22; interleukin-15/Fc fusion protein, normferon, peginterferon α-2a, peginterferon α-2b, recombinant interleukin-15, and RPI-MN.

Non-limiting examples of PI3K inhibitors include idelalisib, alpelisib, buparlisib, CAI orotate, copanlisib, duvelisib, gedatolisib, neratinib, panulisib, perifosine, pictilisib, pilaralisib, puquitinib mesylate, rigosertib, rigosertib sodium, sonolisib, and taselisib.

Non-limiting examples of Integrin α-4/β-7 antagonists include PTG-100, TRK-170, abrilumab, etrolizumab, carotegrast methyl, and vedolizumab.

Non-limiting examples of HIV antibodies, bispecific antibodies, and antibody-like therapeutic proteins include Fab derivatives, bnABs (broadly neutralizing HIV-1 antibodies), and those targeting HIV gp120 or gp41, antibody-recruiting molecules targeting HIV, anti-CD63 monoclonal antibodies, anti-GB virus C antibodies, anti-GP120/CD4, CCR5 bispecific antibodies, anti-nef single domain antibodies, anti-Rev antibody, camelid derived anti-CD18 antibodies, camelid-derived anti-ICAM-1 antibodies, DCVax-001, gp140 targeted antibodies, gp41-based HIV therapeutic antibodies, human recombinant mAbs, ibalizumab, Immuglo, and MB-66.

A non-limiting example of those targeting HIV in such a manner include bavituximab.

Non-limiting examples of pharmacokinetic enhancers include cobicistat and ritonavir.

Non-limiting examples of HIV vaccines include peptide vaccines, recombinant subunit protein vaccines, live vector vaccines, DNA vaccines, CD4-derived peptide vaccines, vaccine combinations, rgp120, monomeric gp120 HIV-1 subtype C vaccine, Remune, ITV-1, Contre Vir, Ad5-ENVA-48, DCVax-001, Vacc-4x, Vacc-C5, VAC-3S, multiclade DNA recombinant adenovirus-5, Pennvax-G, Pennvax-GP, HIV-TriMix-mRNA vaccine, HIV-LAMP-vax, Ad35, Ad35-GRIN, NAcGM3/VSSP ISA-51, poly-ICLC adjuvanted vaccines, TatImmune, GTU-multiHIV, gp140[delta] V2.TV1+MF-59, rVSVIN HIV-1 gag vaccine, SeV-Gag vaccine, and virus-like particle vaccines such as pseudovirion vaccine, CombiVICHvac, LFn-p24 B/C fusion vaccine, GTU-based DNA vaccine, HIV gag/pol/nef/env DNA vaccine, anti-TAT HIV vaccine, conjugate polypeptides vaccine, dendritic-cell vaccines, gag-based DNA vaccine, gp41 HIV-1 vaccine, HIV vaccine (PIKA adjuvant), I i-key/MHC class II epitope hybrid peptide vaccines, ITV-2, ITV-3, ITV-4, LIPO-5, multiclade Env vaccine, MVA vaccine, Pennvax-GP, pp71-deficient HCMV vector HIV gag vaccine, recombinant peptide vaccine, rgp160 HIV vaccine, RNActive HIV vaccine, SCB-703, Tat Oyi vaccine, TBC-M4, therapeutic HIV vaccine, UBI HIV gp120, variant gp120 polypeptide vaccine, and rAd5 gag-pol env A/B/C vaccine.

It will be appreciated by one of skill in the art that the additional therapeutic agents listed above may be included in more than one of the classes listed above. The particular classes are not intended to limit the functionality of those compounds listed in those classes.

In a specific embodiment, the compound of formula (I) can be combined with an HIV nucleoside or nucleotide inhibitor of reverse transcriptase and an HIV non-nucleoside inhibitor of reverse transcriptase. In another specific embodiment, the compound of formula (I) can be combined with an HIV nucleoside or nucleotide inhibitor of reverse transcriptase, and an HIV protease inhibiting compound. In an additional embodiment, the compound of formula (I) can be combined with an HIV nucleoside or nucleotide inhibitor of reverse transcriptase, an HIV non-nucleoside inhibitor of reverse transcriptase, and a pharmacokinetic enhancer. In certain embodiments, the compound of formula (I) can be combined with at least one HIV nucleoside inhibitor of reverse transcriptase, an integrase inhibitor, and a pharmacokinetic enhancer. In another embodiment, the compound of formula (I) is combined with two HIV nucleoside or nucleotide inhibitors of reverse transcriptase.

In a particular embodiment, the compound of formula (I) is combined with tenofovir, emtricitabine, and raltegravir. In a particular embodiment, the compound of formula (I) is combined with tenofovir, emtricitabine, and dolutegravir, In a particular embodiment, the compound of formula (I) is combined with abacavir, lamivudine, and dolutegravir. In a particular embodiment the compound of formula (I) is combined with tenofovir, emtricitabine, and elvitegravir; emtricitabine, ritonavir, and darunavir. In any of the above embodiments, any of the additional therapeutic agents may be in the form of pharmaceutically acceptable salts thereof.

A compound of formula (I) may be combined with one or more additional therapeutic agents in any dosage amount of the compound of Formula (I) (e.g., from 1 mg to 1000 mg of compound).

In a particular embodiment, the compound of formula (I) is combined with tenofovir, emtricitabine, and raltegravir; tenofovir, emtricitabine, and dolutegravir; abacavir, lamivudine, and dolutegravir; tenofovir, emtricitabine, and elvitegravir; or emtricitabine, ritonavir, and darunavir, wherein the additional therapeutic agent can be present in any suitable amount. In any of the above embodiments, any of the additional therapeutic agents may be in the form of pharmaceutically acceptable salts thereof, particularly any clinically approved pharmaceutically acceptable salts thereof.

The compound of formula (I) may be combined with one or more additional therapeutic agents in any dosage amount of the compound of Formula (I) (e.g., from 0.01 mg/kg to 250 mg/kg of compound based on the subject's body weight or 5 mg to 500 mg (e.g., 5 mg to 250 mg, or 5 mg to 200 mg, or 5 mg to 100 mg) per unit dosage form). In certain embodiments, the compound of formula (I) is combined with 5-30 mg tenofovir, 5-300 mg emtricitabine, and 5-30 mg raltegravir; 5-30 mg tenofovir, 5-300 mg emtricitabine, and 5-30 mg dolutegravir; 5-30 mg abacavir, 5-30 mg lamivudine, and 5-30 mg dolutegravir; 5-30 mg tenofovir, 5-300 mg emtricitabine, and 5-30 mg elvitegravir; or 5-300 mg emtricitabine, 5-30 mg ritonavir, and 5-30 mg darunavir.

Gene therapy and cell therapy includes the genetic modification to silence a gene; genetic approaches to directly kill the infected cells; the infusion of immune cells designed to replace most of the patient's own immune system to enhance the immune response to infected cells, or activate the patient's own immune system to kill infected cells, or find and kill the infected cells; genetic approaches to modify cellular activity to further alter endogenous immune responsiveness against the infection.

Examples of dendritic cell therapy include AGS-004.

Non-limiting examples of genome editing systems (gene editors) are a CRISPR/Cas9 system, a zinc finger nuclease system, a TALEN system, a homing endonucleases system, and a meganuclease system.

Examples of HIV targeting CRISPR/Cas9 systems include EBT101.

CAR-T Cell Therapy refers to a population of immune effector cells engineered to express a chimeric antigen receptor (CAR), wherein the CAR comprises an HIV antigen-binding domain. The HIV antigen include an HIV envelope protein or a portion thereof, gp120 or a portion thereof, a CD4 binding site on gp120, the CD4-induced binding site on gp120, N glycan on gp120, the V2 of gp120, the membrane proximal region on gp41. The immune effector cell is a T cell or an NK cell. In some embodiments, the T cell is a CD4+ T cell, a CD8+ T cell, or a combination thereof. A non-limiting example of CAR-T includes VC-CAR-T.

TCR-T cells are engineered to target HIV derived peptides present on the surface of virus-infected cells.

The invention can be characterized by the following embodiments.

1. A compound of formula (I):

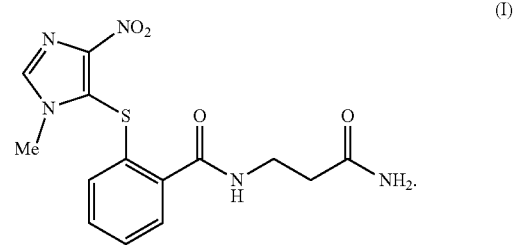 [SMILES: Cn1cnc([N+](=O)[O-])c1Sc1ccccc1C(=O)NCCC(N)=O]

2. A pharmaceutical composition comprising the compound of embodiment 1 and a pharmaceutically acceptable carrier.

3. A method for treating or preventing a human immunodeficiency virus (HIV) infection in a mammal in need thereof, comprising administering to the mammal an effective amount of a compound of formula (I):

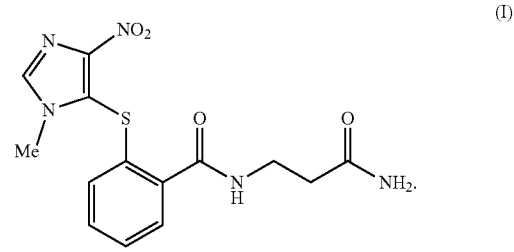 [SMILES: Cn1cnc([N+](=O)[O-])c1Sc1ccccc1C(=O)NCCC(N)=O]

4. The method of embodiment 3, wherein the HIV comprises a virus selected from the group consisting of HIV Clade A, HIV Clade B, HIV Clade C, HIV Clade D, HIV Clade E, HIV Clade F, HIV Clade G, and HIV Clade O.

5. The method of embodiment 3 or embodiment 4, wherein the compound or salt is administered orally.

6. The method of any one of embodiments 3-5, further comprising administering to the mammal one, two, three, or four additional therapeutic agents.

7. The method of embodiment 6, wherein the additional therapeutic agents are selected from the group consisting of combination drugs for HIV, HIV protease inhibitors, HIV non-nucleoside or non-nucleotide inhibitors of reverse transcriptase, HIV nucleoside or nucleotide inhibitors of reverse transcriptase, HIV integrase inhibitors, HIV non-catalytic site integrase inhibitors, HIV entry inhibitors, HIV maturation inhibitors, latency reversing agents, compounds that target the HIV capsid, immune-based therapies, phosphatidylinositol 3-kinase (PI3K) inhibitors, HIV antibodies, bispecific antibodies and "antibody-like" therapeutic proteins, HIV p17 matrix protein inhibitors, IL-13 antagonists, peptidyl-prolyl cis-trans isomerase A modulators, protein disulfide isomerase inhibitors, complement C5a receptor antagonists, DNA methyltransferase inhibitor, HIV vif gene modulators, Vif dimerization antagonists, HIV-1 viral infectivity factor inhibitors, TAT protein inhibitors, HIV-1 Nef modulators, Hck tyrosine kinase modulators, mixed lineage kinase-3 (MLK-3) inhibitors, HIV-1 splicing inhibitors, Rev protein inhibitors, integrin antagonists, nucleoprotein inhibitors, splicing factor modulators, COMM domain containing protein 1 modulators, HIV ribonuclease H inhibitors, retrocyclin modulators, CDK-9 inhibitors, dendritic ICAM-3 grabbing nonintegrin 1 inhibitors, HIV GAG protein inhibitors, HIV POL protein inhibitors, Complement Factor H modulators, ubiquitin ligase inhibitors, deoxycytidine kinase inhibitors, cyclin dependent kinase inhibitors, proprotein convertase PC9 stimulators, ATP dependent RNA helicase DDX3X inhibitors, reverse transcriptase priming complex inhibitors, G6PD and NADH-oxidase inhibitors, pharmacokinetic enhancers, HIV gene therapy, HIV gene editing, and HIV vaccines, and any combination thereof.

8. The method of embodiment 6, wherein the additional therapeutic agents are selected from the group consisting of entry inhibitors, HIV non-nucleoside reverse transcriptase inhibitors, HIV non-nucleotide reverse transcriptase inhibitors, HIV nucleoside reverse transcriptase inhibitors, HIV nucleotide reverse transcriptase inhibitors, integrase inhibitors, protease inhibitors, gp41 inhibitors, CXCR4 inhibitors, gp120 inhibitors, CCR5 inhibitors, capsid polymerization inhibitors, and pharmacokinetic enhancers, and any combination thereof.

9. The method of embodiment 6, wherein the additional therapeutic agents comprise a combination of antiretroviral agents selected from the group consisting of:
  tenofovir, emtricitabine, and raltegravir;
  tenofovir, emtricitabine, and dolutegravir;
  abacavir, lamivudine, and dolutegravir;
  tenofovir, emtricitabine, and elvitegravir; and
  tenofovir, emtricitabine, ritonavir, and darunavir.

10. A method of inhibiting or preventing maturation of an immature human immunodeficiency virus (HIV) to a mature HIV, comprising exposing the immature HIV to a compound of formula (I):

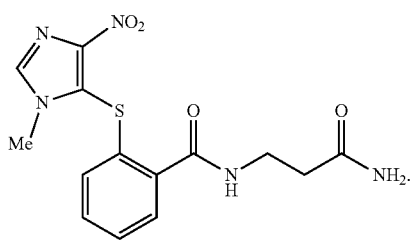

(I)

11. The method of embodiment 10, wherein the HIV comprises a virus selected from the group consisting of HIV Clade A, HIV Clade B, HIV Clade C, HIV Clade D, HIV Clade E, HIV Clade F, HIV Clade G, and HIV Clade O.

12. The method of embodiment 10 or embodiment 11, wherein the compound is administered orally.

13. The method of any one of embodiments 10-12, further comprising administering to the mammal one, two, three, or four additional therapeutic agents.

14. The method of embodiment 13, wherein the additional therapeutic agents are selected from the group consisting of combination drugs for HIV, HIV protease inhibitors, HIV non-nucleoside or non-nucleotide inhibitors of reverse transcriptase, HIV nucleoside or nucleotide inhibitors of reverse transcriptase, HIV integrase inhibitors, HIV non-catalytic site integrase inhibitors, HIV entry inhibitors, HIV maturation inhibitors, latency reversing agents, compounds that target the HIV capsid, immune-based therapies, phosphatidylinositol 3-kinase (PI3K) inhibitors, HIV antibodies, bispecific antibodies and "antibody-like" therapeutic proteins, HIV p17 matrix protein inhibitors, IL-13 antagonists, peptidyl-prolyl cis-trans isomerase A modulators, protein disulfide isomerase inhibitors, complement C5a receptor antagonists, DNA methyltransferase inhibitor, HIV vif gene modulators, Vif dimerization antagonists, HIV-1 viral infectivity factor inhibitors, TAT protein inhibitors, HIV-1 Nef modulators, Hck tyrosine kinase modulators, mixed lineage kinase-3 (MLK-3) inhibitors, HIV-1 splicing inhibitors, Rev protein inhibitors, integrin antagonists, nucleoprotein inhibitors, splicing factor modulators, COMM domain containing protein 1 modulators, HIV ribonuclease H inhibitors, retrocyclin modulators, CDK-9 inhibitors, dendritic ICAM-3 grabbing nonintegrin 1 inhibitors, HIV GAG protein inhibitors, HIV POL protein inhibitors, Complement Factor H modulators, ubiquitin ligase inhibitors, deoxycytidine kinase inhibitors, cyclin dependent kinase inhibitors, proprotein convertase PC9 stimulators, ATP dependent RNA helicase DDX3X inhibitors, reverse transcriptase priming complex inhibitors. G6PD and NADH-oxidase inhibitors, pharmacokinetic enhancers, HIV gene therapy, HIV gene editing, and HIV vaccines, and any combination thereof.

15. The method of embodiment 14, wherein the additional therapeutic agents are selected from the group consisting of entry inhibitors, HIV non-nucleoside reverse transcriptase inhibitors, HIV non-nucleotide reverse transcriptase inhibitors, HIV nucleoside reverse transcriptase inhibitors, HIV nucleotide reverse transcriptase inhibitors, integrase inhibitors, protease inhibitors, gp41 inhibitors, CXCR4 inhibitors, gp120 inhibitors, CCR5 inhibitors, capsid polymerization inhibitors, and pharmacokinetic enhancers, and any combination thereof.

16. The method of embodiment 13, wherein the additional therapeutic agents comprise a combination of antiretroviral agents is selected from the group consisting of:
  tenofovir, emtricitabine, and raltegravir;
  tenofovir, emtricitabine, and dolutegravir;
  abacavir, lamivudine, and dolutegravir;
  tenofovir, emtricitabine, and elvitegravir; and
  tenofovir, emtricitabine, ritonavir, and darunavir.

17. A method of preventing or inhibiting a human immunodeficiency virus (HIV) infection in a mammal in need thereof, wherein the mammal has at least one HIV viral particle on a surface thereof, comprising topically administering to the surface of the mammal an effective amount of a compound of formula (I):

(I)

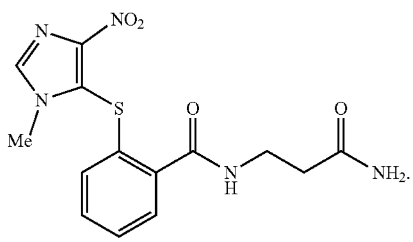

18. The method of embodiment 17, wherein the HIV comprises a virus selected from the group consisting of HIV Clade A, HIV Clade B, HIV Clade C, HIV Clade D, HIV Clade E, HIV Clade F, HIV Clade G, and HIV Clade O.

19. The method of embodiment 17 or embodiment 18, wherein the compound is administered in the form of a pharmaceutical composition comprising the compound and a pharmaceutically acceptable carrier.

The following examples further illustrate the invention but, of course, should not be construed as in any way limiting its scope.

Example 1

This example demonstrates the effect of the compound of formula (I) on the viral load and virus infectivity of rhesus macaques infected with simian immunodeficiency virus (SIV).

Two SIV-infected rhesus macaques were treated with 300 mg/kg of the compound of formula (I) once daily via oral gavage. Viral load before treatment and after 6 months of treatment were measured by RT-PCR. Viral infectivity was determined by measuring the amount of p27 Gag (in pg/mL) in a viral infectivity assay wherein virus isolated from the animals was used to infect CEMx174 cells, followed by ELISA. Viral samples were diluted 1:1000 prior to assay. The CD4 count for each monkey was measured after 6 months. The results are set forth in Table 1.

TABLE 1

| | Untreated | | Treated | | Treated | |
|---|---|---|---|---|---|---|
| Treated Animal | Viral Load | Viral Infectivity | Viral Load | Viral Infectivity | CD4 Count | S.D. |
| 1 | $1.37 \times 10^5$ | 300 | $2.86 \times 10^4$ | <0.1 | 365 | 78 |
| 2 | $4.38 \times 10^4$ | 300 | $1.73 \times 10^3$ | <0.1 | 363 | 87 |

As is apparent from the results set forth in Table 1, daily treatment of rhesus macaques with 300 mg/kg of the compound of formula (I) p.o. over 6 months resulted in reductions in viral load of approximately one log unit. Viral infectivity of SIV from the treated animals was significantly decreased as compared with SIV from the animals before treatment, indicating that treatment with the compound of formula (I) produced immature, non-infectious virus that contains viral RNA. CD4 counts after 6 months were deemed normal. These results demonstrate that animals treated with the compound of formula (I) harbor largely non-infectious virus despite the relatively high, although reduced compared to untreated animals, viral load values.

Example 2

This example demonstrates the absence of toxicity of the compound of formula (I) in rats.

The maximum tolerated dose in rats of the compound of formula (I) was determined to be greater than 2 g/day. A dose range finding study in rats using doses with 2 g/kg p.o., once per day for 14 days, did not show adverse clinical outcomes.

Example 3

This example demonstrates pharmacokinetics of the compound of formula (I).

The compound of formula (I) was administered to cynomolgus macaques at a dose of 300 mg/kg p.o. via oral gavage. In blood, the compound of formula (I) exhibited a half life of 7.6 h (AUC=5779 h*ng/mL) and was converted to two major metabolites, compound 2 and the S-methylated compound 3.

2

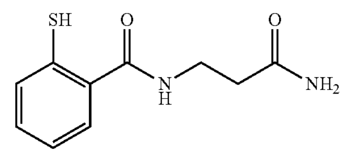

3

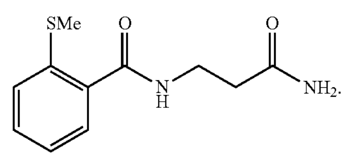

Compound 3 has been found to be non-toxic.

Example 4

This example demonstrates the activity against CXCR4 Tropic Clade B HIV-$1_{92HT599}$ of the compound of formula (I) in human PBMCs.

PHA-P stimulated PBMCs from three donors were pooled together and resuspended in fresh tissue culture medium at $1\times10^6$ cells/mL and plated in the interior wells of a 96 well round bottom microplate at 50 μL/well. A 100 μL volume of 9 concentrations of the compound serially diluted were transferred to the round bottom 96 well plate containing the cells in triplicate. 50 μL of HIV-1 at a predetermined dilution was added. Each plate contained cell control wells and virus control wells in parallel with the experimental wells. After 7 days in culture, efficacy was evaluated by measuring the reverse transcriptase in the culture supernatants and the cells were stained with the tetrazolium dye XTT to evaluate cytotoxicity. The results are set forth in Table 2.

TABLE 2

| Incubation Time (hours) | $EC_{50}$ (μM) | TC50 (μM) |
|---|---|---|
| 0 | 3.23 | >100 |
| 2 | 7.12 | >100 |
| 8 | 5.18 | >100 |
| 24 | 4.45 | >100 |

Example 5

This example demonstrates a synthesis of the compound of formula (I), in accordance with an embodiment of the invention.

(A) Synthesis of 2,2'-disulfanediylbis[N-(3-amino-3-oxopropyl)benzamide] (5)

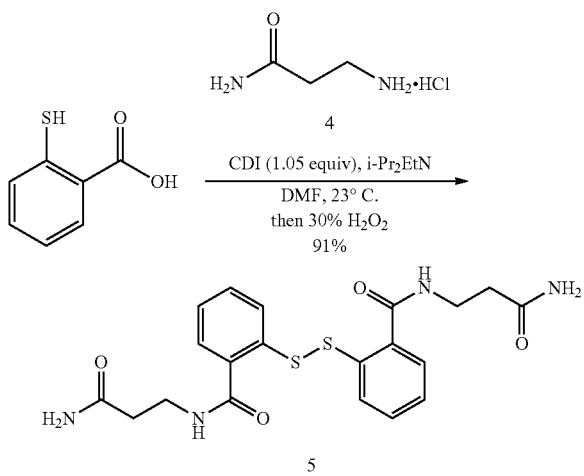

Thiosalicylic acid (50.0 g, 324 mmol, 1 equiv) was added to an oven-dried 2 L round-bottomed flask. The flask was evacuated for 10 min, and placed under an atmosphere of argon. N,N-Dimethylformamide (650 mL) was added, and the reaction mixture was cooled to 0° C. over 30 min. N,N'-Carbonyldiimidazole (55.2 g, 340 mmol, 1.05 equiv) was added to the reaction mixture in one portion, and the resulting mixture was stirred at 0° C. for 30 min. N,N-Di-iso-propylethylamine (187 mL, 1.07 mol, 3.30 equiv) was added to the reaction mixture. The ice bath was removed, and the resulting mixture was allowed to warm to 23° C. over 2 h. 3-Aminopropanamide hydrochloride (4; 44.4 g, 357 mmol, 1.10 equiv) was added to the reaction mixture, and the resulting mixture was stirred at 23° C. for 72 h. The product mixture was concentrated (50° C., 2 torr) to provide a viscous orange residue. The residue was diluted with a 50% ice-water mixture (3.7 L) and transferred to a 4 L beaker charged with a large stir bar. Hydrogen peroxide (30% w/w, 6.60 mL, 64.6 mmol, 0.199 equiv) was added and the resulting mixture was stirred for 1 h. An additional portion of hydrogen peroxide (30% w/w, 6.60 mL, 64.6 mmol, 0.199 equiv) was added and the resulting mixture was stirred for 45 min. The resulting suspension was filtered and the filtered solid was washed with water (5×4.0 L) and dried under a stream of nitrogen for 72 h to provide the disulfide 5 as an off-white amorphous solid (68.3 g, 91%). Using a mortar and pestle, the dried solid was ground into a fine white powder and used in the next reaction without further purification.

$^1$H NMR (400 MHz, DMSO-$d_6$) δ 8.56 (bt, J=4.8 Hz, 1H), 7.62 (app d, J=7.6 Hz, 2H), 7.45 (t, J=7.6 Hz, 1H), 7.39 (bs, 1H), 7.29 (t, J=7.2 Hz, 1H), 3.45 (app q, J=6.0 Hz, 2H), 2.39 (t, J=6.8 Hz, 2H). $^{13}$C NMR (100 MHz, DMSO-$d_6$) δ 172.4, 166.8, 136.7, 133.7, 131.1, 127.9, 125.9, 125.6, 36.0, 34.8. IR (FTIR, thin-film), cm$^{-1}$: 3412 (br), 3280 (br), 1662 (s), 1631 (s), 1544 (m), 1461 (w), 1433 (w), 1408 (w), 1309 (m), 735 (m), 688 (w), 654 (w), 598 (w), 550 (w), 486 (m), 454 (m). HRMS-ESI+ (m/z): [M+H]$^+$ calcd for $C_{20}C_{23}N_4O_4S_2$, 447.1155; found, 447.1168.

(B) Synthesis of N-(3-amino-3-oxopropyl)-2-mercaptobenzamide (6)

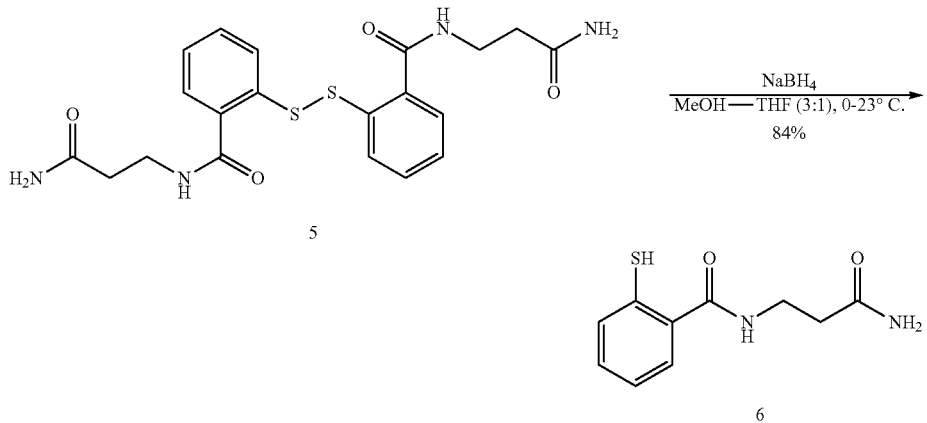

A 1 L beaker was charged with the disulfide 5 (25.0 g, 56.0 mmol, 1 equiv), methanol (420 mL), and tetrahydrofuran (140 mL). The resulting mixture was cooled to 5° C. under a blanket of nitrogen. Sodium borohydride (15.0 g, 397 mmol, 7.08 equiv) was carefully added portionwise (6×2.50 g). The addition of each portion of sodium borohydride increased the reaction temperature to approximately 13° C. Prior to the addition of each subsequent portion, the reaction mixture was cooled to 5° C. Upon addition of the last portion of sodium borohydride, the cooling bath was removed, and the reaction mixture was stirred at 23° C. for 1 h. The homogeneous product mixture was cooled to 5° C., and a solution of water (30 mL) and concentrated aqueous hydrogen chloride solution (11.7 M, 15 mL) was added. The resulting heterogeneous mixture was vacuum-filtered, the filtered solid was washed with methanol (20 mL), and the filtrate was concentrated (35° C., 25 torr) to provide a pale-yellow solid. While under vacuum on the rotary evaporator, the flask was raised from the water bath and allowed to cool to 23° C. The cooled residue thus obtained was diluted with water (400 mL), furnishing a homogenous solution. Mesna (2.50 g, 15.2 mmol, 0.271 equiv) was added, and the resulting solution was acidified to pH 1-2 using concentrated aqueous hydrogen chloride solution. The resulting precipitate was filtered, washed with ice-cold water (150 mL) and ethanol (2×200 mL), and then dried under a stream of nitrogen in a Buchner funnel for 72 h to provide 6 as a pale yellow crystalline solid (21.2 g, 84%); mp=169.3-172.6° C.

$^1$H NMR (400 MHz, DMSO-d$_6$) δ 8.44 (bs, 1H), 7.47 (d, J=7.6 Hz, 1H), 7.40 (d, J=7.6 Hz, 1H), 7.36 (bs, 1H), 7.28 (t, J=7.2 Hz, 1H), 7.16 (t, J=7.2 Hz, 1H), 6.84 (bs, 1H), 5.36 (bs, 1H), 3.40 (app q, J=6.4 Hz, 2H), 2.35 (t, J=7.2 Hz, 2H). $^{13}$C NMR (100 MHz, DMSO-d$_6$) δ 172.4, 167.6, 133.3, 133.0, 130.3, 130.2, 128.2, 124.5, 35.9, 34.8. IR (FTIR, thin-film), cm$^1$: 3361 (br), 3278 (s), 3194 (br), 16338 (s), 1559 (m), 1432 (m), 1144 (w), 1071 (w), 741 (m), 717 (w), 684 (w). HRMS-ESI+ (m/z): [M+Na]$^+$ calcd for C$_{10}$H$_{12}$N$_2$NaO$_2$S, 247.0512; found, 247.0519.

(C) Synthesis of N-(3-amino-3-oxopropyl)-2-[(1-methyl-4-nitro-1H-imidazol-5-yl)thio]benzamide (7)

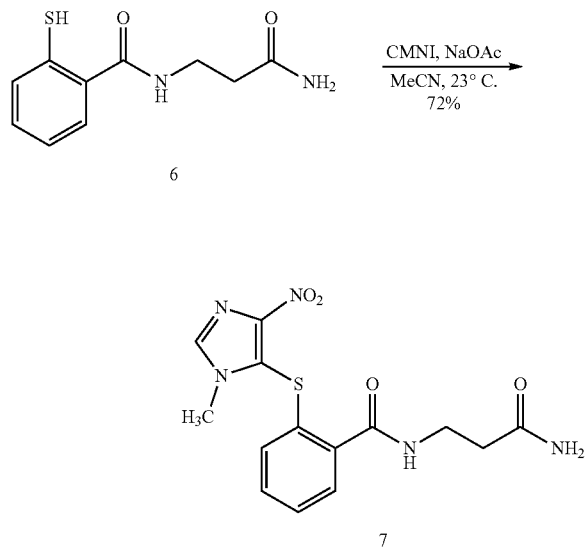 [SMILES: NC(=O)CCNC(=O)c1ccccc1S ; Cn1cnc([N+](=O)[O-])c1Sc1ccccc1C(=O)NCCC(N)=O]

An oven-dried 1 L round-bottomed flask was charged sequentially with the thiol 6 (13.9 g, 61.9 mmol, 1 equiv), 5-chloro-1-methyl-4-nitroimidazole (CMNI; 10.0 g, 61.9 mmol, 1.00 equiv), and sodium acetate (10.2 g, 124 mmol, 2.00 equiv). The flask was evacuated for 10 min, and placed under an atmosphere of argon. Acetonitrile (400 mL) was added, and the reaction mixture was stirred for 2 h at 23° C. The heterogeneous yellow product mixture was heated to reflux and filtered. The filtered solid was washed with hot acetonitrile (2×500 mL), the filtrates were combined, and the combined filtrates were concentrated. The resulting residue was diluted with water (500 mL), sonicated for 1 min, and filtered. The yellow solid thus obtained was dried under a stream of nitrogen in a Buchner funnel for 1 h. The dried solid was recrystallized from hot ethanol to provide a yellow crystalline solid (15.6 g, 72%); mp=184.0-185.6° C.

$^1$H NMR (400 MHz, DMSO-d$_6$) δ 8.68 (bt, J=5.2 Hz, 1H), 8.14 (s, 1H), 7.64 (d, J=8.0 Hz, 1H), 7.39 (bs, 1H), 7.30 (m, 2H), 6.86 (bs, 1H), 6.71 (d, J=7.6 Hz, 1H), 3.58 (s, 3H), 3.44 (q, J=6.8 Hz, 2H), 2.38 (t, J=7.2 Hz, 2H). $^{13}$C NMR (100 MHz, DMSO-d$_6$) δ 172.4, 166.7, 149.1, 139.3, 134.5, 133.4, 131.3, 128.3, 126.9, 126.0, 123.1, 36.0, 34.9, 32.7. IR (FTIR, thin-film), cm$^{-1}$: 3309 (br), 1667 (s), 1644 (s), 1532 (s), 1499 (m), 1378 (m), 1308 (s), 832 (w). HRMS-ESI+ (m/z): [M+H]$^+$ calcd for C$_{14}$H$_{16}$N$_5$O$_4$S, 350.0918; found, 350.0926.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. A compound of formula (I):

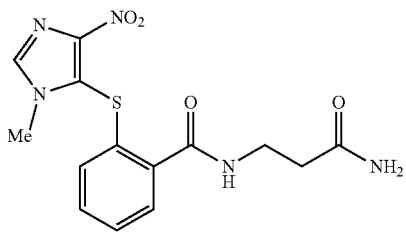

or a pharmaceutically acceptable salt thereof.

2. A pharmaceutical composition comprising the compound of claim 1, or a pharmaceutically acceptable salt thereof, and a pharmaceutically acceptable carrier.

3. A method of treating or preventing a human immunodeficiency virus (HIV) infection in a mammal in need thereof comprising administering to the mammal an effective amount of a compound of claim 1 or a pharmaceutically acceptable salt thereof.

4. The method according to claim 3, wherein the HIV comprises a virus selected from the group consisting of HIV Clade A, HIV Clade B, HIV Clade C, HIV Clade D, HIV Clade E, HIV Clade F, HIV Clade G, and HIV Clade O.

5. The method according to claim 3, wherein the compound or salt is administered orally.

6. The method according to claim 3, further comprising administering to the mammal one, two, three, or four additional therapeutic agents.

7. The method according to claim 6, wherein the one, two, three, or four additional therapeutic agents are selected from the group consisting of combination drugs for HIV, HIV protease inhibitors, HIV non-nucleoside or non-nucleotide inhibitors of reverse transcriptase, HIV nucleoside or nucleotide inhibitors of reverse transcriptase, HIV integrase inhibitors, HIV non-catalytic site integrase inhibitors, HIV entry inhibitors, HIV maturation inhibitors, latency reversing agents, compounds that target the HIV capsid, immune-based therapies, phosphatidylinositol 3-kinase (PI3K) inhibitors, HIV antibodies, bispecific antibodies and "antibody-like" therapeutic proteins, HIV p17 matrix protein inhibitors, IL-13 antagonists, peptidyl-prolyl cis-trans isomerase A modulators, protein disulfide isomerase inhibitors, complement C5a receptor antagonists, DNA methyltransferase inhibitor, HIV vif gene modulators, Vif dimerization antagonists, HIV-1 viral infectivity factor inhibitors, TAT protein inhibitors, HIV-1 Nef modulators, Hck tyrosine kinase modulators, mixed lineage kinase-3 (MLK-3) inhibitors, HIV-1 splicing inhibitors, Rev protein inhibitors, integrin antagonists, nucleoprotein inhibitors, splicing factor modulators, COMM domain containing protein 1 modulators, HIV ribonuclease H inhibitors, retrocyclin modulators, CDK-9 inhibitors, dendritic ICAM-3 grabbing nonintegrin 1 inhibitors, HIV GAG protein inhibitors, HIV POL protein inhibitors, Complement Factor H modulators, ubiquitin ligase inhibitors, deoxycytidine kinase inhibitors, cyclin dependent kinase inhibitors, proprotein convertase PC9 stimulators, ATP dependent RNA helicase DDX3X inhibitors, reverse transcriptase priming complex inhibitors, G6PD and NADH-oxidase inhibitors, pharmacokinetic enhancers, HIV gene therapy, HIV gene editing, and HIV vaccines, and any combination thereof.

8. The method according to claim 7, wherein the one, two, three, or four additional therapeutic agents are selected from the group consisting of entry inhibitors, HIV non-nucleoside reverse transcriptase inhibitors, HIV non-nucleotide reverse transcriptase inhibitors, HIV nucleoside reverse transcriptase inhibitors, HIV nucleotide reverse transcriptase inhibitors, integrase inhibitors, protease inhibitors, gp41 inhibitors, CXCR4 inhibitors, gp120 inhibitors, CCR5 inhibitors, capsid polymerization inhibitors, and pharmacokinetic enhancers, and any combination thereof.

9. The method according to claim 8, wherein the additional therapeutic agents comprise a combination of antiretroviral agents selected from the group consisting of:
tenofovir, emtricitabine, and raltegravir;
tenofovir, emtricitabine, and dolutegravir;
abacavir, lamivudine, and dolutegravir;
tenofovir, emtricitabine, and elvitegravir; and
tenofovir, emtricitabine, ritonavir, and darunavir.

10. The method according to claim 3, which inhibits or prevents maturation of an immature human immunodeficiency virus (HIV) to a mature HIV.

11. The method according to claim 10, wherein the HIV comprises a virus selected from the group consisting of HIV Clade A, HIV Clade B, HIV Clade C, HIV Clade D, HIV Clade E, HIV Clade F, HIV Clade G, and HIV Clade O.

12. The method according to claim 11, wherein the compound or salt thereof is administered orally.

13. The method according to claim 9, further comprising administering to the mammal one, two, three, or four additional therapeutic agents.

14. The method according to claim 13, wherein the one, two, three, or four additional therapeutic agents are selected from the group consisting of combination drugs for HIV, HIV protease inhibitors, HIV non-nucleoside or non-nucleotide inhibitors of reverse transcriptase, HIV nucleoside or nucleotide inhibitors of reverse transcriptase, HIV integrase inhibitors, HIV non-catalytic site integrase inhibitors, HIV entry inhibitors, HIV maturation inhibitors, latency reversing agents, compounds that target the HIV capsid, immune-based therapies, phosphatidylinositol 3-kinase (PI3K) inhibitors, HIV antibodies, bispecific antibodies and "antibody-like" therapeutic proteins, HIV p17 matrix protein inhibitors, IL-13 antagonists, peptidyl-prolyl cis-trans isomerase A modulators, protein disulfide isomerase inhibitors, complement C5a receptor antagonists, DNA methyltransferase inhibitor, HIV vif gene modulators, Vif dimerization antagonists, HIV-1 viral infectivity factor inhibitors, TAT protein inhibitors, HIV-1 Nef modulators, Hck tyrosine kinase modulators, mixed lineage kinase-3 (MLK-3) inhibitors, HIV-1 splicing inhibitors, Rev protein inhibitors, integrin antagonists, nucleoprotein inhibitors, splicing factor modulators, COMM domain containing protein 1 modulators, HIV ribonuclease H inhibitors, retrocyclin modulators, CDK-9 inhibitors, dendritic ICAM-3 grabbing nonintegrin 1 inhibitors, HIV GAG protein inhibitors, HIV POL protein inhibitors, Complement Factor H modulators, ubiquitin ligase inhibitors, deoxycytidine kinase inhibitors, cyclin dependent kinase inhibitors, proprotein convertase PC9 stimulators, ATP dependent RNA helicase DDX3X inhibitors, reverse transcriptase priming complex inhibitors, G6PD and NADH-oxidase inhibitors, pharmacokinetic enhancers, HIV gene therapy, HIV gene editing, and HIV vaccines, and any combination thereof.

15. The method according to claim 13, wherein the one, two, three, or four additional therapeutic agents are selected from the group consisting of entry inhibitors, HIV non-nucleoside reverse transcriptase inhibitors, HIV non-nucleotide reverse transcriptase inhibitors, HIV nucleoside reverse transcriptase inhibitors, HIV nucleotide reverse transcriptase inhibitors, integrase inhibitors, protease inhibitors, gp41 inhibitors, CXCR4 inhibitors, gp120 inhibitors, CCR5 inhibitors, capsid polymerization inhibitors, and pharmacokinetic enhancers, and any combination thereof.

16. The method according to claim 13, wherein the additional therapeutic agents comprise a combination of antiretroviral agents selected from the group consisting of:
   tenofovir, emtricitabine, and raltegravir;
   tenofovir, emtricitabine, and dolutegravir;
   abacavir, lamivudine, and dolutegravir;
   tenofovir, emtricitabine, and elvitegravir; and
   tenofovir, emtricitabine, ritonavir, and darunavir.

17. The method according to claim 3, which prevents or inhibits a human immunodeficiency virus (HIV) infection in a mammal in need thereof, wherein the mammal has at least one HIV viral particle on a surface thereof.

18. The method according to claim 17, wherein the HIV comprises a virus selected from the group consisting of HIV Clade A, HIV Clade B, HIV Clade C, HIV Clade D, HIV Clade E, HIV Clade F, HIV Clade G, and HIV Clade O.

19. The method according to claim 17, which comprises topically administering the compound or a pharmaceutically acceptable salt thereof to the surface in the form of a pharmaceutical composition comprising the compound or a pharmaceutically acceptable salt thereof and a pharmaceutically acceptable carrier.

20. The method according to claim 18, which comprises topically administering the compound or a pharmaceutically acceptable salt thereof to the surface in the form of a pharmaceutical composition comprising the compound or a pharmaceutically acceptable salt thereof and a pharmaceutically acceptable carrier.

* * * * *